US011734728B2

(12) United States Patent
Gupta et al.

(10) Patent No.: US 11,734,728 B2
(45) Date of Patent: Aug. 22, 2023

(54) METHOD AND APPARATUS FOR PROVIDING WEB ADVERTISEMENTS TO USERS

(71) Applicant: [24]7.ai, Inc., San Jose, CA (US)

(72) Inventors: Nitin Gupta, San Jose, CA (US); Gaurav Kumar, Fremont, CA (US)

(73) Assignee: [24]7.ai, Inc., Campbell, CA (US)

( * ) Notice: Subject to any disclaimer, the term of this patent is extended or adjusted under 35 U.S.C. 154(b) by 0 days.

(21) Appl. No.: 16/795,315

(22) Filed: Feb. 19, 2020

(65) Prior Publication Data

US 2020/0265467 A1     Aug. 20, 2020

(30) Foreign Application Priority Data

Feb. 20, 2019  (IN) .............................. 201941006629

(51) Int. Cl.
    *G06Q 30/0241* (2023.01)
    *G06Q 30/0242* (2023.01)
    *G06Q 30/0251* (2023.01)
    *G06F 18/23213* (2023.01)
(52) U.S. Cl.
    CPC .... *G06Q 30/0277* (2013.01); *G06F 18/23213* (2023.01); *G06Q 30/0246* (2013.01); *G06Q 30/0271* (2013.01)
(58) Field of Classification Search
    CPC ........... G06Q 30/0246; G06Q 30/0271; G06Q 30/0207–0277; G06K 9/6223; G06K 9/6226; G06F 18/23213; G06F 18/2321
    See application file for complete search history.

(56) References Cited

U.S. PATENT DOCUMENTS

| 6,665,653 | B1 | 12/2003 | Heckerman et al. |
| 2011/0082824 | A1 | 4/2011 | Allison et al. |
| 2012/0022952 | A1 | 1/2012 | Cetin et al. |
| 2014/0046754 | A1 | 2/2014 | Lee et al. |
| 2019/0102802 | A1* | 4/2019 | Tuschman ............. G06N 20/20 |
| 2019/0205698 | A1* | 7/2019 | Liu .................... G06Q 30/0242 |

FOREIGN PATENT DOCUMENTS

CA            3027129 A1    12/2017

\* cited by examiner

*Primary Examiner* — Chinyere Mpamugo
(74) *Attorney, Agent, or Firm* — Perkins Coie LLP; Michael Glenn

(57) ABSTRACT

A method and apparatus for providing Web advertisements to online users is disclosed. A balanced set of negative data points and positive data points is derived from a log of Ad impressions and used to train a classifier. In response to an Ad request signal, a plurality of Ads is retrieved from a database. The Ad request signal indicates a request to provide an Ad for a slot available on a Web page associated with a website. The signal is provided in relation to an access of the Web page by an online user and includes information related to the online user. A choice of an Ad is predicted based on the information related to the online user and the plurality of Ads. The Ad is provided to a Web server to cause display of the Ad on the slot when the Web page is displayed to the online user.

20 Claims, 8 Drawing Sheets

METHOD AND APPARATUS FOR PROVIDING WEB ADVERTISEMENTS TO USERS

CROSS REFERENCE TO RELATED APPLICATIONS

This application claims priority to Indian provisional patent application No. 201941006629, filed Feb. 20, 2019, which is incorporated herein in its entirety by this reference thereto.

TECHNICAL FIELD

The present technology generally relates to Web advertising and, more particularly, to a method and apparatus for providing Web advertisements to users.

BACKGROUND

Many enterprises rely on Web advertising to connect with existing and potential users of their products, services and/or information offerings. For example, an enterprise may display Web advertisements or 'Ads' on Ad publishing channels, such as third-party websites, to attract customer traffic through their content. An interested viewer of an Ad may click on the Ad to initiate an interaction with an agent of an enterprise, or, to initiate a purchase transaction through the Ad. Typically, the click through rate, i.e. the rate at which the viewers are clicking on the Ad, or the conversion rate, i.e. the rate at which the viewers are engaging in purchase transactions subsequent to clicking on the Ad, for most advertisements is quite low. For example, in the context of Web advertising, the click through rate may be of the order of ~0.01%, while the conversion rate may be of the order of ~0.001%.

Accordingly, one key objective for most enterprises, which engage in Web advertising, is to optimize the conversion rate and/or the click through rate. The optimization of the conversion rate and/or the click through rate is challenging because the data to achieve the optimization is extremely imbalanced. More specifically, the data includes very few instances of Ads resulting in conversion or clicks (also referred to herein as 'positive data points') and a very large number of instances of Ads that did not result in a conversion or a click (also referred to herein as 'negative data points'). As the negative data points are far more in number as compared to the positive data points, the data to achieve the optimization is imbalanced. Training a machine learning model on this imbalanced data is extremely challenging and prone to errors. Further, normal evaluation metrics such as precision, recall, f-measure and Area under ROC curve (AUC) are affected badly and are more biased towards the negative data points.

Accordingly, there is a need to provide relevant Ads to users to optimize the conversion rate and/or the click through rate. It would also be advantageous to provide means to balance the data to facilitate selection of relevant Ads for optimizing the conversation rate and/or the click through rate.

SUMMARY

In an embodiment of the invention, a computer-implemented method for providing Web advertisements to online users is disclosed. The method trains a classifier of an apparatus associated with an advertisement (Ad) server by using a balanced set of negative data points and positive data points derived from a log of Ad impressions. The balanced set is configured based at least in part on identifying a consensus among base cluster representations generated by clustering the negative data points using two or more clustering algorithms. The method receives, by the apparatus, a signal indicating a request to provide at least one Ad for a slot available on a Web page associated with a website. The signal is provided to the apparatus in relation to an access request for the Web page by an online user. The signal at least in part includes information related to the online user. The method retrieves a plurality of advertisements (Ads), by the apparatus, from a database associated with the apparatus in response to the receipt of the signal. The method predicts, by the apparatus using the classifier, a choice of an Ad from among the plurality of Ads based at least in part on the information related to the online user and the plurality of Ads. The method provides, by the apparatus, the Ad to a Web server associated with the website to cause display of the Ad on the slot available on the Web page when the Web page is displayed to the online user.

In an embodiment of the invention, an apparatus for providing Web advertisements to online users is disclosed. The apparatus includes a processor and a memory. The memory stores instructions. The processor is configured to execute the instructions and thereby cause the apparatus to at least train a classifier by using a balanced set of negative data points and positive data points derived from a log of Ad impressions. The balanced set is configured based at least in part on identifying a consensus among base cluster representations generated by clustering the negative data points using two or more clustering algorithms. The apparatus receives a signal indicating a request to provide at least one Ad for a slot available on a Web page associated with a website. The signal is provided to the apparatus in relation to an access request for the Web page by an online user. The signal at least in part includes information related to the online user. The apparatus retrieves a plurality of advertisements (Ads), by the apparatus, from a database associated with the apparatus in response to the receipt of the signal. The apparatus predicts using the classifier, a choice of an Ad from among the plurality of Ads based at least in part on the information related to the online user and the plurality of Ads. The apparatus provides the Ad to a Web server associated with the website to cause display of the Ad on the slot available on the Web page when the Web page is displayed to the online user.

In an embodiment of the invention, a non-transitory computer-readable medium storing a set of instructions is disclosed. The set of instructions when executed causes a computer to perform a method for providing Web advertisements to online users. The method trains a classifier by using a balanced set of negative data points and positive data points. The balanced set is configured by receiving a log of advertisement (Ad) impressions from at least one of one or more demand-side platforms (DSPs) and one or more Ad Exchanges. The negative data points and the positive data points are derived based at least in part on the log of Ad impressions. The negative data points are clustered using two or more clustering algorithms to generate corresponding base cluster representations. A consensus is identified among the base cluster representations to generate an ensemble cluster. A plurality of data points within a predefined distance from a cluster center of the ensemble cluster is selected. The selected plurality of data points configure a first data of data points. A second set of data points is generated by oversampling the positive data points. The first set of data points and the second set of data points configure the balanced set of data points. The method receives a signal indicating a request to provide at least one Ad for a slot available on a Web page associated with a website. The signal is provided to the computer in relation to an access request for the Web page by an online user. The signal at least in part includes information related to the online user. The method retrieves a plurality of advertisements (Ads) from a database in response to the receipt of the signal. The method predicts, using the classifier, a choice of an Ad from among the plurality of Ads based at least in part on the information related to the online user and the plurality of Ads. The method provides the Ad to a Web server associated with the website to cause display of the Ad on the slot available on the Web page when the Web page is displayed to the online user.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1A:
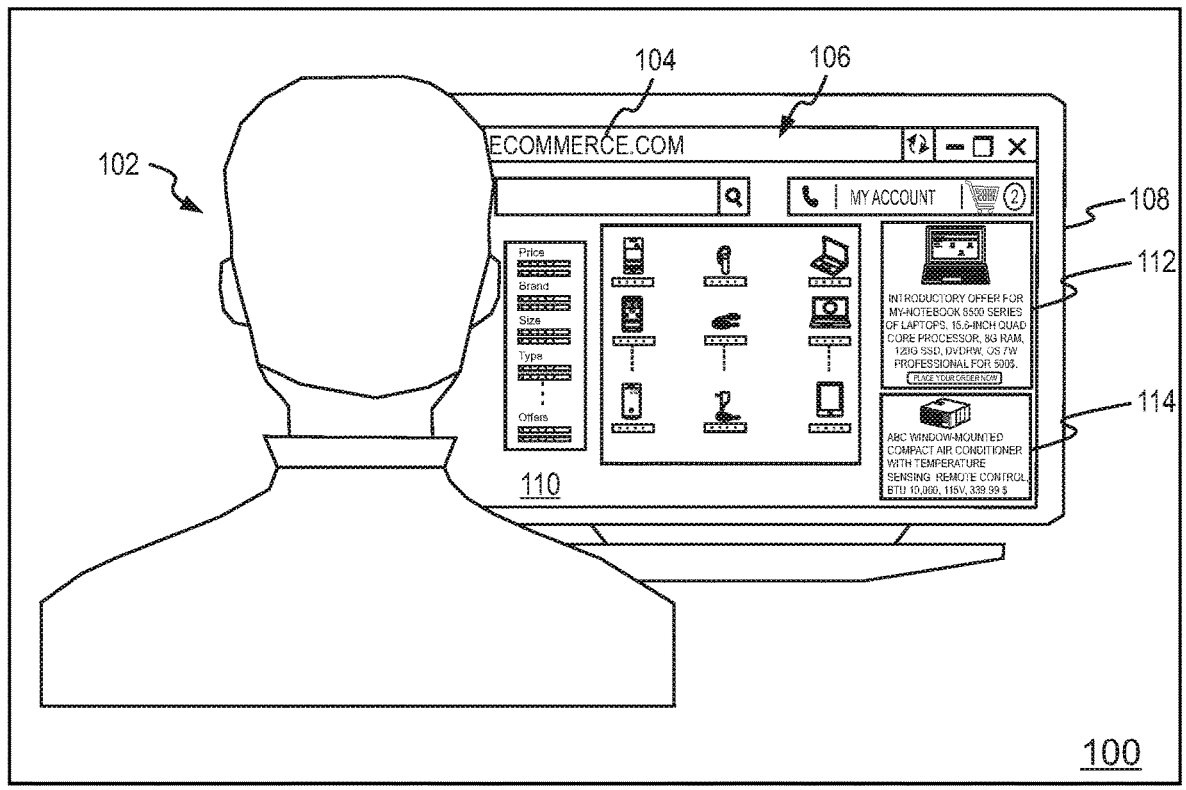
FIG. 1A is a representation showing Web advertisements displayed to an online user on user access of a website, in accordance with an example scenario.

FIG. 1A is a representation 100 showing Web advertisements displayed to an online user 102 on a user visiting a website 104, in accordance with an example scenario.

The online user 102 is exemplarily depicted to have accessed the website 104 using a Web browser application 106 on an electronic device, exemplarily depicted to be a desktop computer 108. The online user 102 may alternatively use any other electronic device, such as a smartphone, a mobile phone, a tablet device, a laptop computer, a Web-enabled wearable device and the like, to access the website 104. The website 104 may be hosted on a remote Web server and the Web browser application 106 may be configured to retrieve one or more Web pages associated with the website 104 from the remote Web server over a network (not shown in FIG. 1A). Examples of the network may include wired networks, wireless networks and combinations thereof. Some examples of the wired networks may include Ethernet, local area networks (LAN), fiber-optic cable networks, and the like. Some examples of the wireless networks may include cellular networks like GSM/CDMA/3G/4G/5G networks, wireless LANs, Bluetooth or ZigBee networks, and the like. An example of a combination of the wired networks and the wireless networks is the Internet. It is understood that the website 104 may attract a large number of existing and potential customers, such as the online user 102.

It is noted that the website 104 is depicted to be an Electronic-commerce (i.e. Ecommerce) website associated with uniform resource locator (URL) as 'www.my-favorite-ecommerce.com' for illustration purposes. It is understood that the website 104 may correspond to a website offered by a Web search engine service provider, a retailer, a news website or any third-party website offered by a private or a public enterprise.

In an example scenario, the online user 102 may provide a textual input in a URL section of the Web browser application 106. In response to the textual input, a Web page user interface (UI) such as a UI 110 associated with the website 104 may be displayed on a display screen of the desktop computer 108. In addition to the main content of the UI 110, one or more advertisements, such as an advertisement 112 and an advertisement 114 may be displayed to the online user 102.

The advertisements, such as the advertisement 112, are designed to attract a user's attention and their primary aim is to persuade online users, such as the online user 102, to click on the advertisements so that the online users can then be directed to another website, for example the enterprise website, where the online users may either engage in an interaction with an agent of the enterprise or may be displayed product specifications along with other details, such as for example delivery options, EMI options, etc., to facilitate a purchase transaction on the enterprise website.

The providing of Web advertisements, such as the advertisement 112, to online users such as the online user 102, is further explained with reference to FIG. 1B.

Figure 1B:
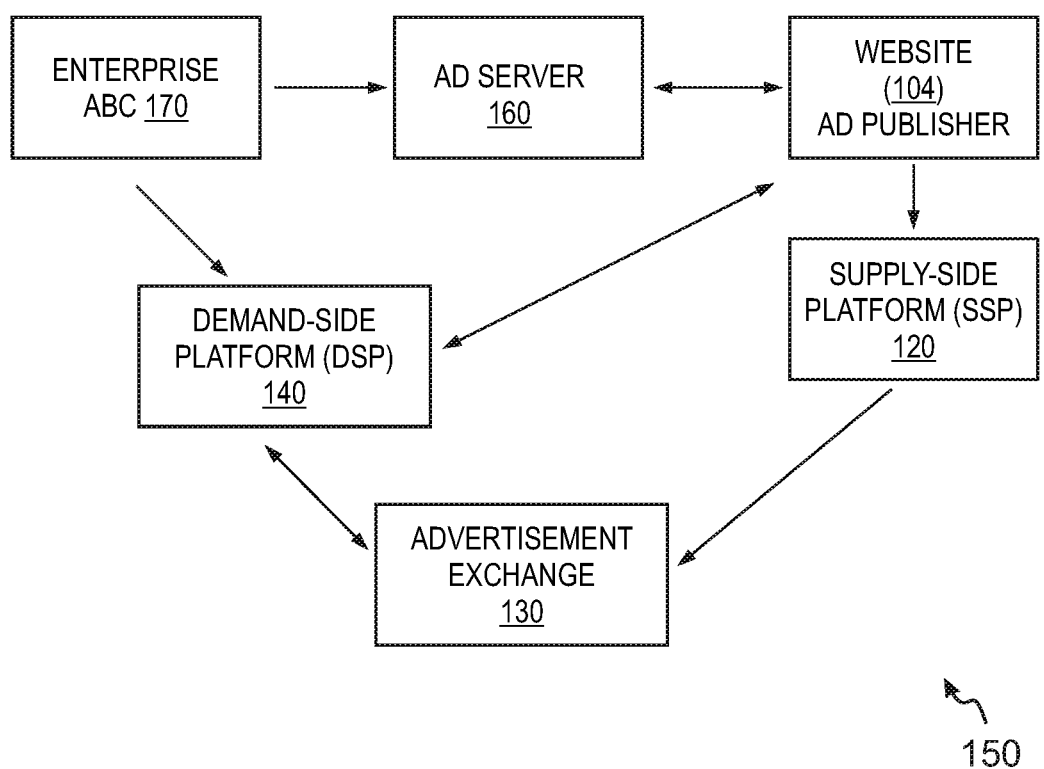
FIG. 1B shows a block diagram of an Ad network configured to provide Web advertisements to online users, in accordance with an example scenario.

FIG. 1B shows a block diagram of an Ad network 150 configured to provide Web advertisements to online users, in accordance with an example scenario. It is noted that a simplified form of the Ad network 150 is shown herein for illustration purposes. It is understood that the Ad network 150 may involve several other components, which are not shown herein.

In FIG. 1A, the online user 102 is depicted to have visited the website 104 (i.e. www.my-favorite-ecommerce.com). The website 104 includes a plurality of Ad slots capable of receiving Ads to be displayed to an online user during display of the Web page UI 110. As the website 104 includes one or more Web pages capable of displaying Ads to its users, the website 104 is hereinafter referred to as an 'Ad publisher'. Ad publishers, such as the website 104, sell the advertising slots/spaces to advertisers, such as an enterprise ABC associated with the advertisement 112 (shown in FIG. 1A), without participating in tedious negotiations with advertisers directly as will be explained in further detail hereinafter.

Most Ad publishers typically include JavaScript (JS) embedded in their respective Web pages. When an access request for a Web page is received from a user, the JS associated with the Web page is configured to send a request to a Supply-Side Platform (SSP) 120.

The SSP 120 is a technology platform with which Ad publishers, such as the website 104, can make available their inventory (i.e. the advertisement slots) to a large number of potential buyers. The SSP 120 also enables the Ad publishers to set criteria on which advertisers can or cannot purchase their inventory and set the minimum prices for which their inventory can be sold to certain buyers.

When a JS request is received by the SSP 120, it in turn, is configured to send the request to an Advertisement exchange 130, hereinafter referred to as an 'Ad exchange 130'. An Ad exchange, such as the Ad exchange 130 is a trading platform that enables advertisers and publishers to buy and sell advertising space. In response to the receipt of request, the Ad exchange 130 is configured to request bids from multiple demand-side platforms, such as a demand-side platform (DSP) 140. It is noted that only one DSP is shown herein for illustration purposes and that the Ad exchange 130 may request bids from multiple DSPs. It is understood that a DSP is a system that allows buyers of digital advertising inventory (i.e. the advertisers) to manage multiple ad exchanges and set Ad display preferences through a single interface.

The Ad exchange 130 passes information related to the Ad publisher, such as the Web URL, IP address, etc. to the DSPs. Each DSP will now match an advertiser from its database to the obtained publisher from the Ad exchange 130. This is done using complex algorithms involving machine learning, contextual data, natural language processing (NLP), and the like. Thereafter, each DSP creates a bid response including the bid amount, the advertiser information, the advertiser JS tag, etc., and sends the bid response to the Ad exchange 130.

In an example scenario, the DSP 140 found an enterprise ABC 170 to be the best match for the information related to the Ad publisher and provisioned a bid on behalf of the enterprise ABC 170 to the Ad exchange 130. After receiving the bids from all the DSPs, the Ad exchange 130 performs a real-time bidding (RTB) auction and chooses the DSP with the highest bid. In an example scenario, the bid response from the enterprise ABC 170 may be the highest bid and accordingly, the Ad exchange 130 may select the enterprise ABC 170 as the advertiser for a slot on the website 104. It is noted that the highest bidder (i.e. the enterprise ABC 170) pays an amount equal to the second highest bid as per second-price auction scheme. The Ad exchange 130 informs the DSP 140 of the selection of its bid and the DSP 140, in turn, and sends the response to the Ad publisher (i.e. the website 104).

The Ad publisher using the advertiser JS tag in the response, calls an advertiser Ad server 160 asking for the advertisement, such as the advertisement 112 shown in FIG. 1A. It is noted the Ad server 160 stores advertisements associated with the enterprise ABC 170. After receiving the advertisement from the Ad server 160, the Ad publisher, i.e. the website 104 displays the Ad on its page. An example display of the advertisement 112 on the UI 110 of the website 104 is exemplarily shown in FIG. 1A.

As explained above, the Ad publisher using the advertiser JS tag (hereinafter referred to as an 'Ad tag') in the response requests the Ad server 160 to provide the advertisement. The Ad server 160 may be tasked with providing the most relevant Ad, which optimizes the probability of the online user clicking on the Ad, or, optimizes the probability of the online user engaging in a purchase transaction subsequent to clicking on the Ad. In at least some example scenarios, a machine learning model may be trained to identify the relevant creatives configuring the Ad to be displayed to the online user. However, the data required to train the machine learning model is extremely imbalanced. More specifically, the data includes very few instances of Ads resulting in conversion or clicks (also referred to herein as 'positive data points') and a very large number of instances of Ads that did not result in a conversion or a click (also referred to herein as 'negative data points'). As the negative data points are far more in number compared to the positive data points, the data to achieve optimization is imbalanced. Training a machine learning model on this imbalanced data is extremely challenging and prone to errors. Further, normal evaluation metrics such as precision, recall, f-measure and Area under ROC curve (AUC) are affected badly and are more biased towards the negative data points.

Various embodiments of the present invention provide a method and an apparatus that are capable of overcoming the above obstacles and providing additional advantages. More specifically, various embodiments disclosed herein provide a method and apparatus for providing Web advertisements to online users. The method and apparatus as disclosed herein provide techniques for balancing imbalanced data set (i.e. the positive and the negative data points) for identifying relevant Ads or relevant creatives for configuring the Web advertisements. The Web advertisements provided to the online users in such a manner optimizes the click through rate and/or the conversion rate for the respective Ads. An apparatus for providing Web advertisements to the online users is explained in detail with reference to FIG. 2.

Figure 2:
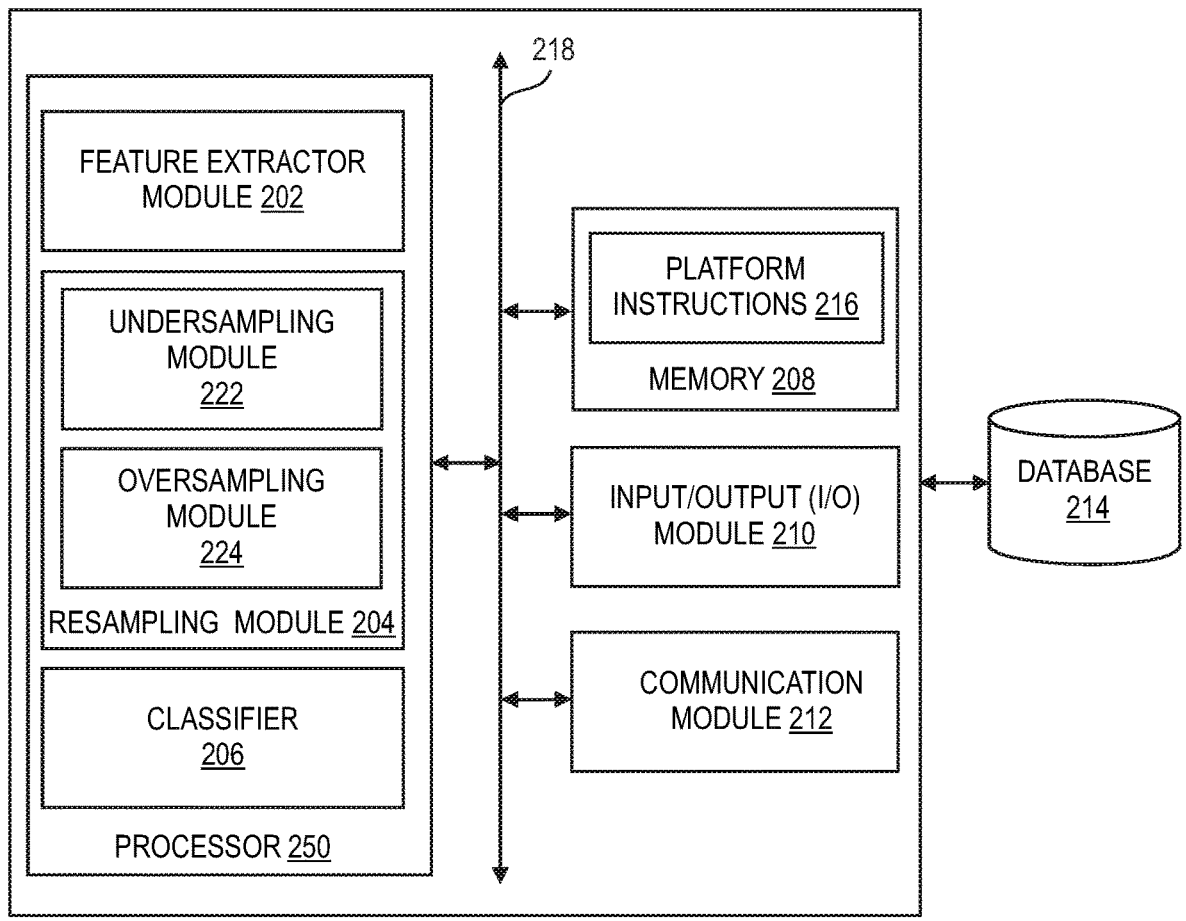
FIG. 2 is a block diagram of an apparatus configured to provide Web advertisements to online users, in accordance with an embodiment of the invention.

FIG. 2 is a block diagram of an apparatus 200 configured to provide Web advertisements to online users, in accordance with an example embodiment. The term 'providing a Web advertisement to an online user' as used herein implies providing digital content configuring an advertisement for display in an Ad slot on a Web page UI and for which an Ad tag was requested. It is noted that the digital content configuring the advertisement should not be limited to only the baseline content of the Ad. It is noted that all advertisements, typically, include some baseline content. For example, advertisements related to products on the E-commerce Website may include product images in few dimensions. Such images may include a baseline content, such as the actual image of the product, along with other related content, such as the image background, other objects, text content highlighting a new product feature, promotional content and the like. In some scenarios, enterprises may advertise their offerings using video and/or audio content. For example, a banking enterprise wishing to advertise housing loans may provide a video advertisement showing one or more houses with associated imagery, such as adjacent landscapes, children playing in the yard, sunrise backdrops and the like. In such a case, the actual content related to the housing loan offer may constitute the baseline content. The related content such as the image background, other objects, text content highlighting a new product feature, promotional content etc., and the content elements such as buttons displaying text such as 'Click Here', 'Buy Now', etc.) and messages (for example 'Discount Offer', 'Cheap Deals', etc.) together configure the non-baseline content. Accordingly, the digital content configuring the advertisement may include both the baseline content and the appropriate non-baseline content, which together configure the final content capable of being displayed in the Ad slot.

In at least one embodiment, the apparatus 200 may be associated with an advertiser. The term 'advertiser' as used herein implies an enterprise or any entity acting on behalf of the enterprise for managing the Ad campaign, such as for example, the Ad campaign manager, the Ad agency, the marketer, and the like. The apparatus 200 is in operable communication with the Ad server, such as the Ad server 160, one or more DSPs and one or more Ad publishers, such as the Ad publishing website 104 shown in FIGS. 1A and 1B.

In one embodiment, the Ad server 160 may forward the Ad tag request along with the online user information received from the DSP 140 to the apparatus 200. The apparatus 200 is configured to process the information related to the online user and provide the relevant Web advertisement to the Ad server 160 which may then forward the Web advertisement to the website 104 (i.e. the website associated with the Ad slot in which the Web advertisement is to be displayed). The Ad publisher may then be configured to display the Web advertisement on the Web page UI of the website 104 for online user consumption. It is noted the terms 'online user', 'user' or 'visitor' are used interchangeably herein and refers to any existing or potential user of enterprise offerings such as products, services and/or information, who is currently present on an advertisement channel such as a website or a native mobile application and is a suitable target for enterprise advertisement(s).

The apparatus 200 includes a processor 250, a memory 208, an input/output (I/O) module 210 and a communication module 212. The processor 250 is depicted to include a feature extractor module 202, a resampling module 204 and a classifier 206. It is noted that although the apparatus 200 is depicted to include the processor 250, the memory 208, the input/output (I/O) module 210 and the communication module 212, in some embodiments, the apparatus 200 may include more or fewer components than those depicted herein. The various components of the apparatus 200 may be implemented using hardware, software, firmware or any combinations thereof.

In some embodiments, the processor 250 may be embodied as a multi-core processor, a single core processor, or a combination of one or more multi-core processors and one or more single core processors. For example, the processor may be embodied as one or more of various processing devices, such as a coprocessor, a microprocessor, a controller, a digital signal processor, a processing circuitry with or without an accompanying digital signal processor, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor may be configured to execute hard-coded functionality. In an embodiment, the processor is embodied as an executor of software instructions, wherein the instructions may specifically configure the processor to perform the algorithms and/or operations described herein when the instructions are executed.

In an embodiment, the memory 208 is capable of storing machine executable instructions, referred to herein as platform instructions 216. The processor 250 and the various modules of the processor 250, such as the feature extractor module 202, the resampling module 204 and the classifier 206 may be configured to execute the platform instructions 216. In addition to the platform instructions 216, in at least some embodiments, the memory 208 may be configured to store machine learning models for use by the classifier 206 to facilitate identification of the relevant Web advertisements for the online users. The memory 208 may be embodied as one or more volatile memory devices, one or more non-volatile memory devices, and/or a combination of one or more volatile memory devices and non-volatile memory devices. For example, the memory 208 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In an embodiment, the I/O module 210 may include mechanisms configured to receive inputs from and provide outputs to the user of the apparatus 200. The term 'user of the apparatus 200' as used herein may refer to any individual, whether directly or indirectly, associated with ad campaign management and/or the enterprise. To enable reception of inputs and provide outputs to the user of the apparatus 200, the I/O module 210 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, at least one module of the apparatus 200 may include I/O circuitry configured to control at least some functions of one or more elements of the I/O module 210, such as, for example, a speaker, a microphone, a display, and/or the like. The module of the apparatus 200 and/or the I/O circuitry may be configured to control one or more functions of the one or more elements of the I/O module 210 through computer program instructions, for example, software and/or firmware, stored on a memory, for example, the memory 208, and/or the like, accessible to the module of the apparatus 200.

The communication module 212 is configured to facilitate communication between the apparatus 200 and one or more remote entities over a communication network. For example, the communication module 212 is capable of facilitating communication with a plurality of DSPs, with Ad servers, with Web servers hosting enterprise websites, and in some cases, with electronic devices of the online users.

The apparatus 200 is depicted to be in operative communication with a database 214. The database 214 is any computer-operated hardware suitable for storing and/or retrieving data. The database 214 may include multiple storage units such as hard disks and/or solid-state disks in a redundant array of inexpensive disks (RAID) configuration. In some embodiments, the database 214 may include a storage area network (SAN) and/or a network attached storage (NAS) system.

In some embodiments, the database 214 is integrated within the apparatus 200. For example, the apparatus 200 may include one or more hard disk drives as the database 214. In other embodiments, the database 214 is external to the apparatus 200 and may be accessed by the apparatus 200 using a storage interface (not shown in FIG. 2). The storage interface is any component capable of providing the processor 250 with access to the database 214. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 250 with access to the database 214.

In one embodiment, the database 214 is configured to store a plurality of advertisements associated with the enterprise. Further, the database 214 is also configured to store baseline content and non-baseline content corresponding to the plurality of advertisements. For example, in addition to the baseline content, the database 214 also stores a plurality of content elements such as buttons (for example, buttons displaying text such as 'Click Here', 'Buy Now', etc.) and messages (for example 'Discount Offer', 'Cheap Deals', etc.), which may be used along with the baseline content. As explained above, baseline content may be combined with non-baseline content to generate the relevant creative configuring the Web advertisement.

Furthermore, the database 214 may also store a log of Ad impressions received from one or more DSPs and one or more Ad exchanges using the communication module 212. It is noted that an Ad served to an online user is termed as an Ad impression. If the same Ad is displayed to a thousand online users, then the respective Web advertisement is associated with thousand Ad impressions. The database 214 may be configured to maintain for each Ad, a record of a number of Ad impressions (i.e. the number of times the Ad was served), number of associated clicks, number of associated conversions along with information related to online users to whom the respective Ads were served. In some embodiments, the apparatus 200 may receive information related to the Ad impressions from DSPs and one or more Ad Exchanges on a periodic basis, such as for example, after every few hours, or after every day, etc., and the information related to the Ad impressions is stored in the database 214 in the form of the log of Ad impressions.

Further, the database 214 stores information related to a plurality of online users associated with the Ad impressions, i.e. the online users who have viewed the Ads. In an illustrative example, online user record may include information such as user identification information, user device information (for example, device type, device operating system, browser information etc.) IP address, user contact information (for example, email address, billing address, phone number etc.). Each user record may also include a count of impressions across user devices.

In an embodiment, various components of the apparatus 200, such as the processor 250, the memory 208, the input/output (I/O) module 210 and the communication module 212 are configured to communicate with each other via or through a centralized circuit system 218. The centralized circuit system 218 may be various devices configured to, among other things, provide or enable communication between the components (202-214) of the apparatus 200. In certain embodiments, the centralized circuit system 218 may be a central printed circuit board (PCB) such as a motherboard, a main board, a system board, or a logic board. The centralized circuit system 218 may also, or alternatively, include other printed circuit assemblies (PCAs) or communication channel media.

It is noted that the apparatus 200 as illustrated and hereinafter described is merely illustrative of a system that could benefit from embodiments of the invention and, therefore, should not be taken to limit the scope of the invention. It is noted that the apparatus 200 may include fewer or more components than those depicted in FIG. 2. In an embodiment, the apparatus 200 may be implemented as an interaction platform including a mix of existing open systems, proprietary systems and third-party systems. In another embodiment, the apparatus 200 may be implemented completely as a platform including a set of software layers on top of existing hardware systems. In an embodiment, one or more components of the apparatus 200 may be deployed in a Web Server or in a Cloud Infrastructure. In another embodiment, the apparatus 200 may be a standalone component in a remote machine connected to a communication network and capable of executing a set of instructions (sequential and/or otherwise) to provide Web advertisements to online users. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as Ad agency/marketer devices. In another embodiment, the apparatus 200 may be a central system that is shared by or accessible to each of such devices.

In at least one example embodiment, the apparatus 200 is configured to receive information related to Ad impressions for Ads served to online users on one or more Ad publishers (i.e. on one or more websites). As explained above, the apparatus 200 is in operable communication with an Ad server of an enterprise, a plurality of DSPs, and a plurality of Ad Exchanges using the communication module 212. The communication module 212 is configured to facilitate the receipt of the information related to Ad impressions from one or more DSPs and one or more Ad Exchanges. The received information is stored in the form of log of Ad impressions in the database 214.

In at least one embodiment, the log of Ad impressions is retrieved by the feature extractor module 202 of the processor 250 from the database 214. In at least one embodiment, the log of Ad impressions comprises information related to (1) Ads impressions associated with one or more Ad publishers, and (2) online users of the one or more Ad publishers served with the Ad impressions. The feature extractor module 202 is configured to extract features of the online users, who were served the Ads associated with Ad impressions. The features extracted from information related to the online users may include, but are not limited to, user location, device-type, browser and OS type, demographic information, context, etc. The feature extractor module 202 also extracts features from the Ads served to these online users. For example, the baseline content, theme, background, message, call-to-action button, etc., may be extracted from the creatives configuring the Ads. The feature extractor module 202 is configured to tag each extracted feature with a label or a tag depending on whether a click or conversion is associated with the impression or not. The feature for which there is a matching click or conversion is tagged as a positive data point, whereas the feature for which there is no associated click or conversion is tagged as a negative data point. Since the negative data points are a lot more than the positive data points, the negative data points form the 'majority class' whereas the positive data points form the 'minority class'. Thus, a number of negative data points and positive data points are derived from the log of Ad impressions.

The negative data points configuring the majority class are provided to the resampling module 204 of the processor 250 by the feature extractor module 202. In at least one embodiment, the resampling module 204 includes an undersampling module 222 and an oversampling module 224. The negative data points configuring the majority class are provided to the undersampling module 222, whereas the positive data points configuring the minority class are provided the oversampling module 224. The output of the undersampling module 222 is a subset of the data points of the majority class that are most significant as will be explained later.

In at least one embodiment, the processor 250 is configured to use two or more clustering algorithms to cluster the negative data points and generate base cluster representations. More specifically, the undersampling module 222 of the resampling module 204 in the processor 250 is configured to use two or more clustering algorithms to cluster the negative data points and generate base cluster representations. Each clustering algorithm performs a clustering exercise on all the negative data points to generate corresponding base cluster representations. As such individual negative data points may be classified into different clusters or the same cluster by different clustering algorithms. In one example embodiment, three clustering algorithms: Latent Dirichlet Allocation (LDA), Gaussian Mixture Models (GMM) and K— Means are used to cluster the negative data points and generate base cluster representations.

For the first clustering algorithm, i.e. LDA, each data point from the majority class is considered as a document and the values of various dimensions are considered as words. The document and topic concentrations are initialized with symmetric prior. The document and topic distributions are learned using the Expectation Maximization (EM) algorithm.

Using the same set of data points, a Gaussian Mixture Model (i.e. the second clustering algorithm) is also learned with a hundred Gaussian Mixing components. The parameters for the mixture models are trained using the EM algorithm. At each iteration of the E-step, the expectation of the component assignments for each data point is calculated given the model parameters followed by the maximization step, which maximizes the expectation calculated in the E-step with respect to model parameters. Data points are assigned to one of the mixes by applying Bayes Theorem and the estimated model parameters to estimate the posteriori component assignment probability. In one embodiment, the GMM is trained in a distributed environment on a spark cluster.

For the third clustering algorithm, a simple K-Means cluster is trained using the same data points with number of clusters represented by 'K' set to 100.

The undersampling module 222 is further configured to build an ensemble cluster using an entropy based approach. As per the entropy based approach, an entropy criterion is applied to get the uncertainty of each cluster with respect to base cluster. The goal of ensemble clustering is to build a consensus across these clusters to generate a modified and more meaningful cluster representation. Given the ensemble, Y, the uncertainty of cluster Ci with respect to the ensemble cluster Y can be computed as:

$$H_k(C_i) = \Sigma_{i=1}^{n^k} \Sigma_{j=1}^{n^k} p(C_i, C_j) \log p(C_i, C_j) \quad (1)$$

$$\text{with } p(C_i, C_j) = \frac{|C_i \cap C_j|}{|C_i|}, \text{ where}$$

$n^k$ is number of clusters in a base cluster $\Phi$,
$C_j$ is $j^{th}$ cluster in the base cluster $\Psi$
$\cap$ is intersection of two sets
$\|$ is count of objects in each set.

When all objects of a cluster $C_i$ belong to same base cluster $\Phi$, the uncertainty of $C_i$ with respect to $\Phi$ is low. Conversely, if objects of $C_i$ belong to multiple different clusters in $\Phi$, then entropy is high.

For each cluster, a cluster entropy index may be calculated based on the entropy using equation (2) below:

$$I_{C_k} = e^{-\frac{Hm(C_k)}{\theta}} \quad (2)$$

In many cases, the Ad impressions may be requested from multiple DSPs and multiple exchanges. In such cases, relevancy weights may be applied on these Ad impressions based on prior knowledge of quality of traffic from Ad impression of previous DSPs and exchanges. Additionally, each data point may be predicted with assistance from a bot or a human. Using prior weights ($\omega$) on each data point based on the quality of the traffic and the cluster entropy index $I_{C_k}$ of the cluster the data point belongs to, a locally weighted co-association matrix for a given ensemble cluster $\Psi$ may be constructed as:

$$M = \{a_{i,j}\}_{N*N},$$

$$\text{where } a_{i,j} = \Sigma_{k=1}^{k} \omega_l I_{C_k} * \partial_{i,j}^k \text{ with } \partial_{i,j}^k = \begin{cases} 1, & \text{if } \theta_k(i) = \theta_k(j) \\ 0 \end{cases}$$

otherwise $\theta_k$ (i) represents the cluster the $i^{th}$ object belongs to.

The co-association matrix is used to initialize the consensus function. The final consensus function is achieved through an iterative process. At every iteration, similar regions may be grouped together. The number of iterations determines the number of clusters required. In one embodiment, a plurality of data points within a predefined distance from a cluster center of the ensemble cluster are selected. For example, the data points closest to the K cluster centers are then selected using the Mahalanobis distance. The identified data points configure the first set of data points to be included in the final training and validation set for training of a machine learning model.

In at least one example embodiment, the oversampling module 224 is configured to use Synthetic Minority Oversampling Technique (SMOTE) algorithm to over sample the positive data points representative of the minority class. The data points resulting from the oversampling configure the second set of data points to be included in the final training and validation set for training of the machine learning model. It is noted that the undersampling of the data points of the majority class to configure the first set of data points, and, the oversampling of the data points of the minority class to configure the second set of data points are performed in such a manner that a balanced set of data points is created for training the machine learning model.

The classifier 206 of the processor 250 is configured to receive the balanced set of negative data points and positive data points (i.e. the undersampled form of negative data points and oversampled positive data points) and train a classifier (i.e. the machine learning model) to perform prediction to meet a predefined objective. Some examples of the predefined objective may include, but are not limited to, an objective to increase a likelihood of the online user clicking on the Ad, an objective to increase a likelihood of the online user engaging in a purchase transaction in relation to the Ad, and an objective to increase an awareness of the online user, and the like. In an illustrative example, the predetermined objective may be to improve the click ratio. Accordingly, the online user data for a given Ad slot may be processed by the classifier 206 to predict the most relevant creative for displaying the Ad slot, such that the probability of the online user clicking on the Ad is higher.

A process flow for training a machine learning model for use by the classifier 206 to facilitate identification of the relevant Web advertisement from among a plurality of Web advertisements is explained next with reference to FIG. 3.

Figure 3:
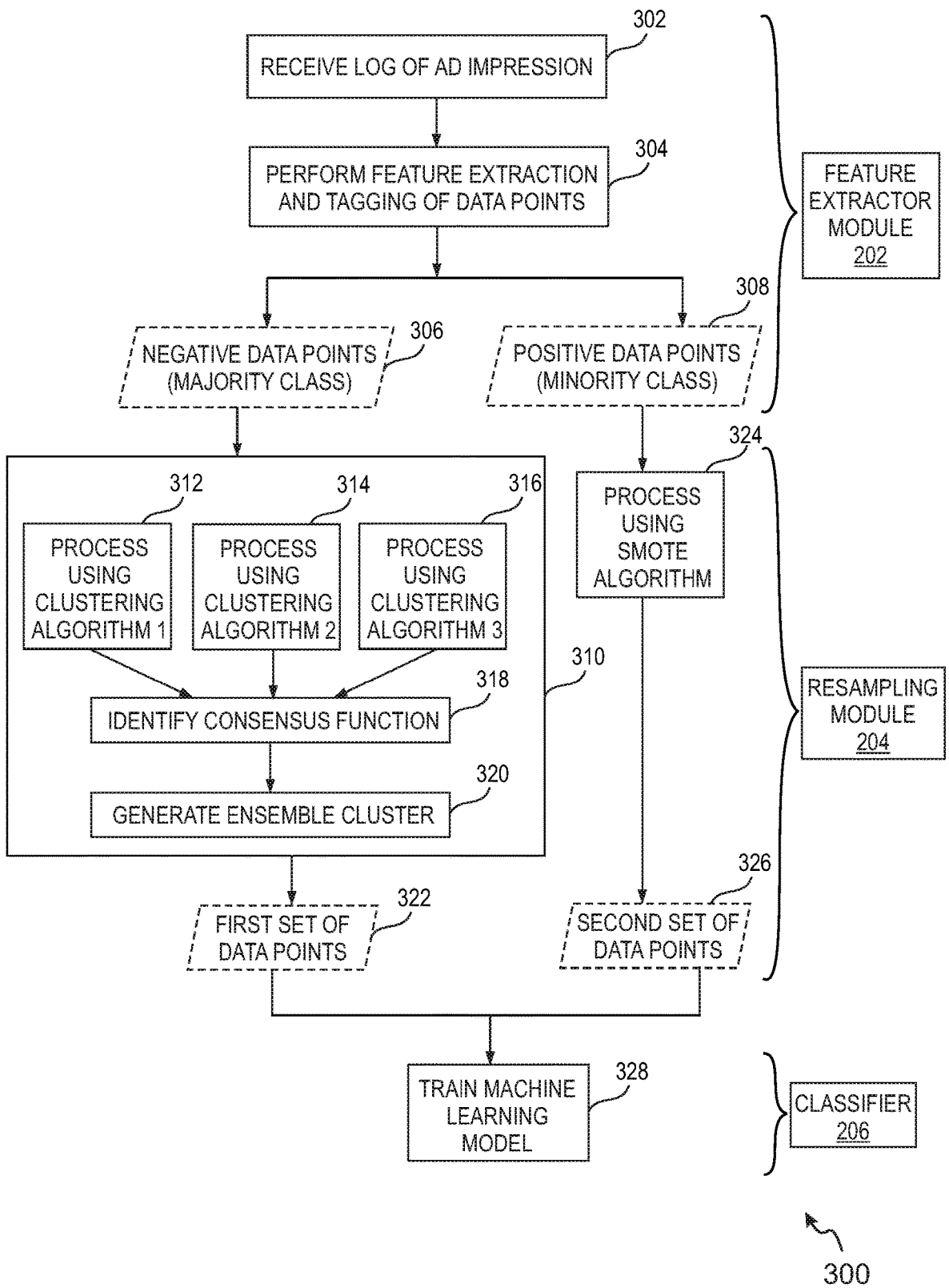
FIG. 3 is a representation of a process flow for illustrating a training of a machine learning model for providing relevant Web advertisements to online users, in accordance with an embodiment of the invention.

FIG. 3 is a representation of a process flow 300 for illustrating a training of a machine learning model for providing relevant Web advertisements to online users, in accordance with an example embodiment. The process flow 300 starts at 302.

At 302 of the process flow 300, a log of Ad impressions is received by the feature extractor module 202 of the processor 250 (shown in FIG. 2). As explained with reference to FIG. 2, the communication module 212 of the apparatus 200 (shown in FIG. 2) is in operative communication with the Ad server, a plurality of DSPs, a plurality of Ad exchanges, a plurality of Ad publishers, and the like. The information related to the Ad impressions associated with one or more Ad publishers corresponding to the various Ads served to the online users is received by the apparatus 200 using the communication module 212. In at least some embodiments, the information is stored in the database 214 (shown in FIG. 2) in the form of a log. The feature extractor module 202 is configured to receive the log of Ad impressions from the database 214.

At 304 of the process flow 300, the feature extractor module 202 is configured to perform extraction of features (i.e. data points) and tagging of the data points with labels. For example, the features related to the online users such as location, device type, browser type, browsing attributes etc., may all be extracted and normalized to configure data points. Further, the various features of the creatives such as baseline content, theme, background, call-to-action buttons, etc., may also be extracted and normalized to configure data points. The data points may then be tagged with labels, such as positive data points (i.e. the data points are associated with a click or a conversion) or negative data points (i.e. the data points are not associated with a click or a conversion). As explained above, the negative data points are larger in number and thereby configure the majority class, and the positive data points are smaller in number and thereby configure the minority class. The output of the feature extractor module 202 is exemplarily depicted to be negative data points 306 and positive data points 308 in FIG. 3.

The negative data points 306 and the positive data points 308 are provided to the resampling module 204 (shown in FIG. 2). The resampling module 204 includes the undersampling module 222 and the oversampling module 224 (not shown in FIG. 3). In at least one example embodiment, the negative data points 306 are provided to the undersampling module 222, whereas the positive data points 308 are provided to the oversampling module 224.

The processing of the negative data points 306, for example by the undersampling module 222 of the resampling module 204 is shown using a block 310 in FIG. 3. More specifically, all the negative data points 306 are provided to three clustering algorithms for generating base cluster representations for the negative data points. Accordingly, the negative data points are processed using clustering algorithm 1 at 312, using clustering algorithm 2 at 314 and clustering algorithm 3 at 316. It is noted that three clustering algorithms are considered herein for example purposes. The undersampling module 222 may perform clustering of the negative data points 306 using two or more number of clustering algorithms. A consensus of the clustering for each data point may then be determined using a consensus function 318. As explained with reference to FIG. 2, an uncertainty of each base cluster vis-à-vis an ensemble cluster may be determined and thereafter an ensemble cluster may be generated at 320 using an entropy approach as explained with reference to FIG. 2. The ensemble cluster may then be used to identify the first set of data points 322 representative of an undersampled form of the majority class.

As the ensemble cluster is generated based on the consensus among three different clustering representations of the negative data points, the ensemble cluster provides the best representation of the base clusters. An example representation showing the ensemble cluster generated from obtaining the consensus of base cluster representations of the negative data points 306 is shown in FIG. 4.

Figure 4:
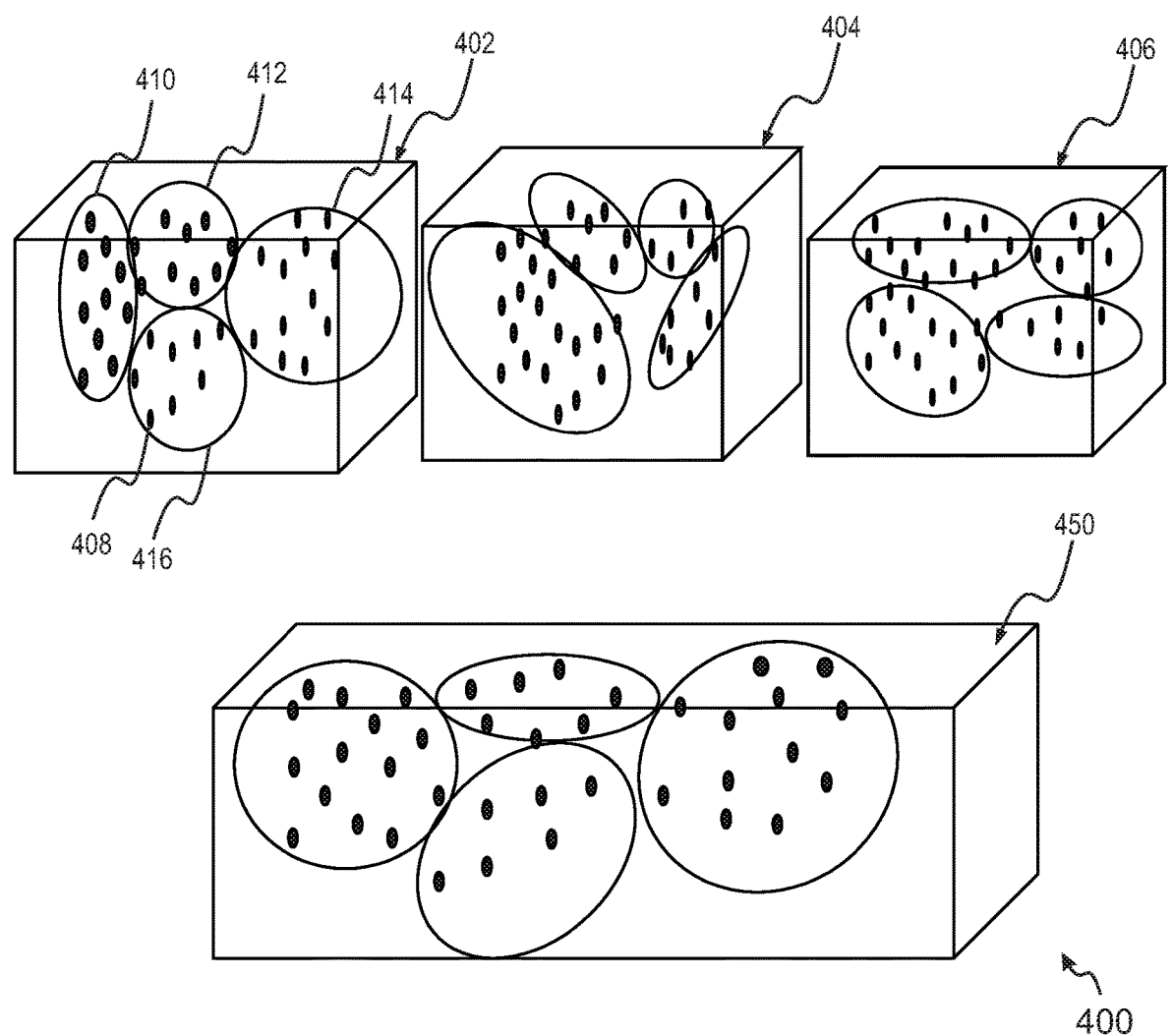
FIG. 4 shows a representation for illustrating a generation of an ensemble cluster, in accordance with an embodiment of the invention.

Referring now to FIG. 4, a representation 400 for illustrating a generation of the ensemble cluster is shown, in accordance with an example embodiment. The representation 400 depicts three base cluster representations 402, 404 and 406 generated by using clustering algorithm 1, clustering algorithm 2 and clustering algorithm 3, respectively. For example, the negative data points, such as a negative data point 408, are depicted to be clustered using four base clusters, for example using base clusters 410, 412, 414 and 416, as exemplarily shown in base cluster representation 402. The same set of negative data points are clustered into four base clusters, differently by the clustering algorithms 2 and 3 as exemplarily shown in base cluster representations 404 and 406, respectively. The undersampling module 222 (shown in FIG. 2) is configured to identify a consensus (i.e. best representation) for each data point using entropy-based approach as explained with reference to FIG. 2. The net result of the iterative process of determining the consensus results in the ensemble cluster shown using representation 450. For each base cluster in the ensemble cluster representation 450, cluster centers or centroids may be identified and 'K' nearest neighbors of the cluster centers may then be identified to configure the first set of data points representative of the undersampled majority class.

Referring back to FIG. 3, the positive data points 308 configuring the minority class are processed using the oversampling module 224 (shown in FIG. 2) at 324. More specifically, the oversampling module 224 uses SMOTE algorithm to perform oversampling of the positive data points 308. The output of the SMOTE based processing is the second set of data points 326, which is representative of the oversampled minority class.

It is noted that the first set of data points and the second set of data points together configure a balanced data set of positive data points and negative data points, i.e. both the positive and the negative data points are substantially equal in number. The balanced set may then be used for training and validating a machine learning model. The training of the machine learning model is performed by the classifier 206 at 328. It is noted that the machine learning model may be trained to receive input, such as for example online user attributes, and provide output in terms of the most relevant creative (i.e. Web advertisement) for the online user. The term 'most relevant' as used herein may be interpreted as the creative which is most likely to achieve the desired action from the online user (for example, a click, a conversion, a view, etc.,). The trained machine learning model may then be used to serve real-time requests for Ads from Ad publishers to fill-up Ad slots on their respective online mediums.

Referring back to FIG. 2, in at least one embodiment, the apparatus 200 is configured to receive a signal indicating a request to provide an Ad for a slot available on a Web page associated with a website. In an example scenario, an online user may provide an access request for a Web page of a Web site by submitting an Uniform Resource Locator (URL) on the Web browser application installed on the electronic device associated with the online user. The submission of the URL may be treated as a Web page access request and, in relation to the Web page access request, the Web server hosting the website may provide a signal to the Ad server to indicate a request to provide an advertisement for the slot available on the Web page. In at least one embodiment, the Ad server may forward the signal to the apparatus 200. Alternatively, in some embodiments, the apparatus 200 on account of being in operative communication with one or more Ad publishers may directly receive the signal indicating the request to provide the Ad, using the communication module 212. In at least embodiment, the signal may include information related to the online user requesting the Web page access. For example, the information related to the online user may include information such as user identification information, user device information (for example, device type, device operating system, browser information etc.) IP address, user contact information (for example, email address, billing address, phone number etc.).

The processor 250 of the apparatus 200 may be configured to receive the signal and in response to the receipt of the signal, retrieve a plurality of advertisements from the database 214. The processor 250 may further be configured to provide the plurality of advertisements and the information related to the online user requesting Web page access to the classifier 206. As explained with reference to FIGS. 3 and 4, the classifier 206 includes a machine learning model trained using a balanced set of data points to predict a choice of an Ad from among the plurality of Ads based on the information related to the online user and the plurality of Ads. The term 'predicting a choice of an Ad' as used herein implies providing a selection of an Ad from among the plurality of Ads, which is most likely to meet the predefined objective of increasing a likelihood of the online user clicking on the Ad, of increasing a likelihood of the online user engaging in a purchase transaction in relation to the Ad, or of increasing an awareness of the online user. The processor 250 is further configured to provide the Ad to the Web server associated with the website to cause display of the Ad on the slot available on the Web page when the Web page is displayed to the online user. The display of the Ad on a slot in the Web page UI may be performed as shown with reference to the advertisement 112 in FIG. 1A. A sequence flow diagram for providing a Web advertisement to an online user is explained next with reference to FIG. 5.

Figure 5:
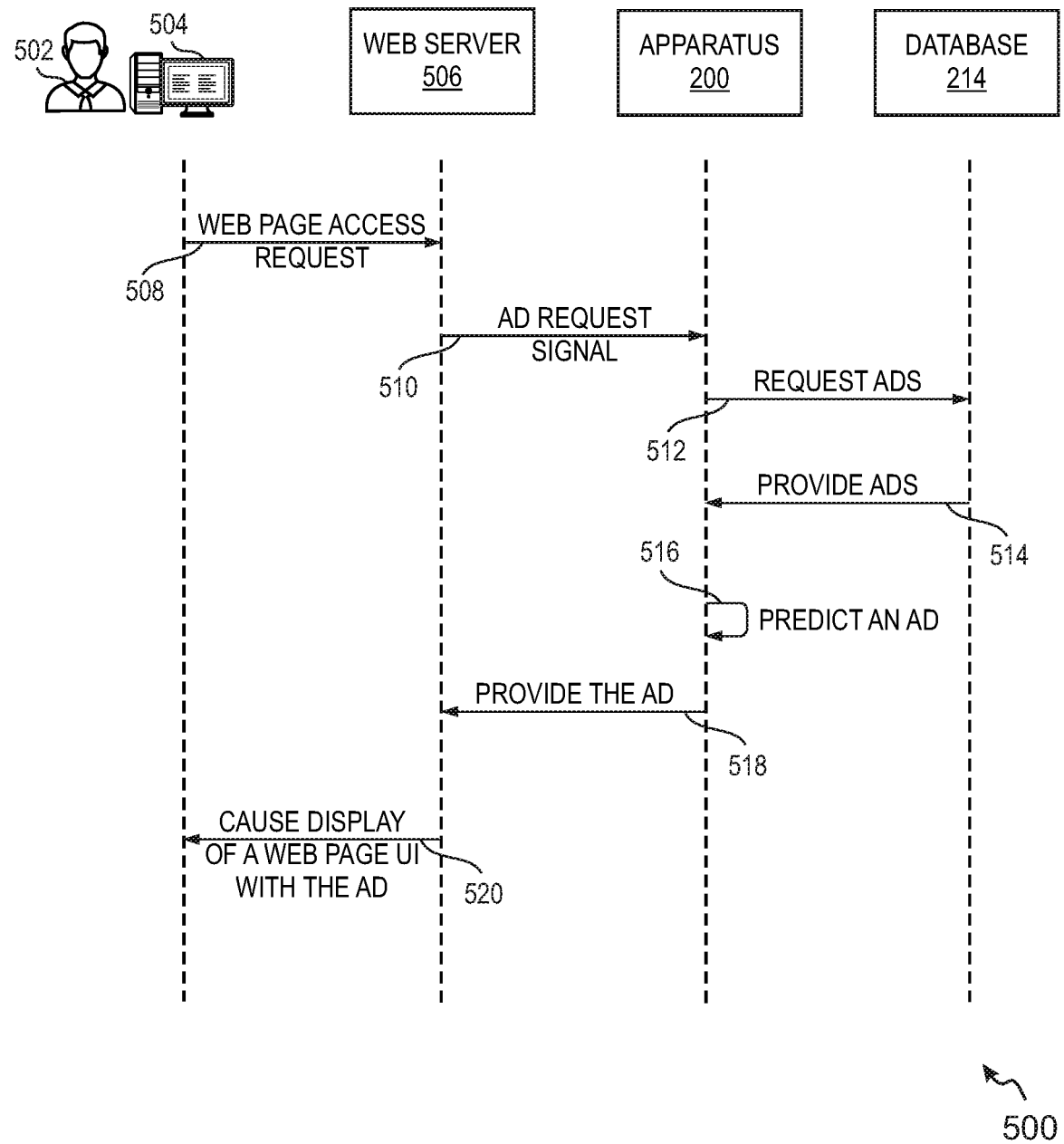
FIG. 5 shows a sequence flow diagram for providing a Web advertisement to an online user, in accordance with an embodiment of the invention.

FIG. 5 is a sequence flow diagram 500 for illustrating a process flow for providing a web advertisement to an online user, in accordance with an embodiment of the invention. The sequence flow diagram 500 depicts an online user 502 associated with an electronic device 504, a Web server 506 hosting a website (not shown in FIG. 5) including a number of Web pages, the database 214 and the apparatus 200, which is configured to provide Web advertisements to online users as explained with reference to FIGS. 2 to 4. The process flow illustrated by the sequence flow diagram 500 starts at 508.

At 508, the online user 502 provides a request to the Web server 506 to access a Web page of the website. The request may be provided in the form of a submission of an URL on a Web browser application included within the electronic device 504. More specifically, the online user 502 may enter a URL associated with the Web page to be accessed on the Web browser application, which may be configured to direct the URL to the Web server 506 hosting the website, which includes the Web page.

At 510, the Web server 506 provides a signal indicating a request to provide an advertisement to the apparatus 200. The signal indicating the request to provide the advertisement is also referred to hereinafter as 'Ad request signal'. It is noted that the sequence flow diagram 500, as shown in FIG. 5, is simplified to show the receipt of the Ad request signal at the apparatus 200 from the Web server 506. However, it is noted that the Web server 506 may use an Ad network, such as the Ad network 150 shown in FIG. 1B, to provide the request for the Ad to the enterprise. More specifically, as explained with reference to FIG. 1B, the requesting of the Web page access may trigger a bidding for an Ad slot available on the Web page and an enterprise may be selected for providing an Ad for the Ad slot based on the winning bid. Thereafter, the Web server 508 may provide an Ad tag to an Ad server associated with the enterprise to request the Ad for the Ad slot. In at least one embodiment, the Ad request signal in the form of an Ad tag received from the Web server 506 is forwarded to the apparatus 200 by the Ad server (not shown in FIG. 5). In at least one embodiment, the Ad request signal includes information related to the online user. The information related to the online user may include information such as user identification information, user device information (for example, device type, device operating system, browser information etc.) IP address, user contact information (for example, email address, billing address, phone number etc.).

At 512, the apparatus 200 is configured to request advertisements related to the enterprise from the database 214 associated with the apparatus 200.

At 514, the database 214 provides a plurality of advertisements to the apparatus 200.

At 516, the apparatus 200 is configured to use a trained classifier, such as the classifier 206 explained with reference to FIGS. 2 to 4 to predict an advertisement (Ad) suitable for display on the Ad slot based on information related to the online user 502 and the plurality of advertisements. The prediction may be performed by the classifier 206, which is trained using a balanced set of data points. The generation of the balanced set of data points for training the classifier is explained with reference to FIGS. 2 to 4.

At 518, the apparatus 200 provides the Ad predicted by the classifier 206 to the Web server 506.

At 520, the Web server 506 is configured to cause display of a Web page UI including the Ad on the electronic device 504 of the online user 502. The process flow illustrated by the sequence flow diagram 500 ends at 520. A method for providing Web Advertisements to online users is explained next with reference to FIG. 6.

Figure 6:
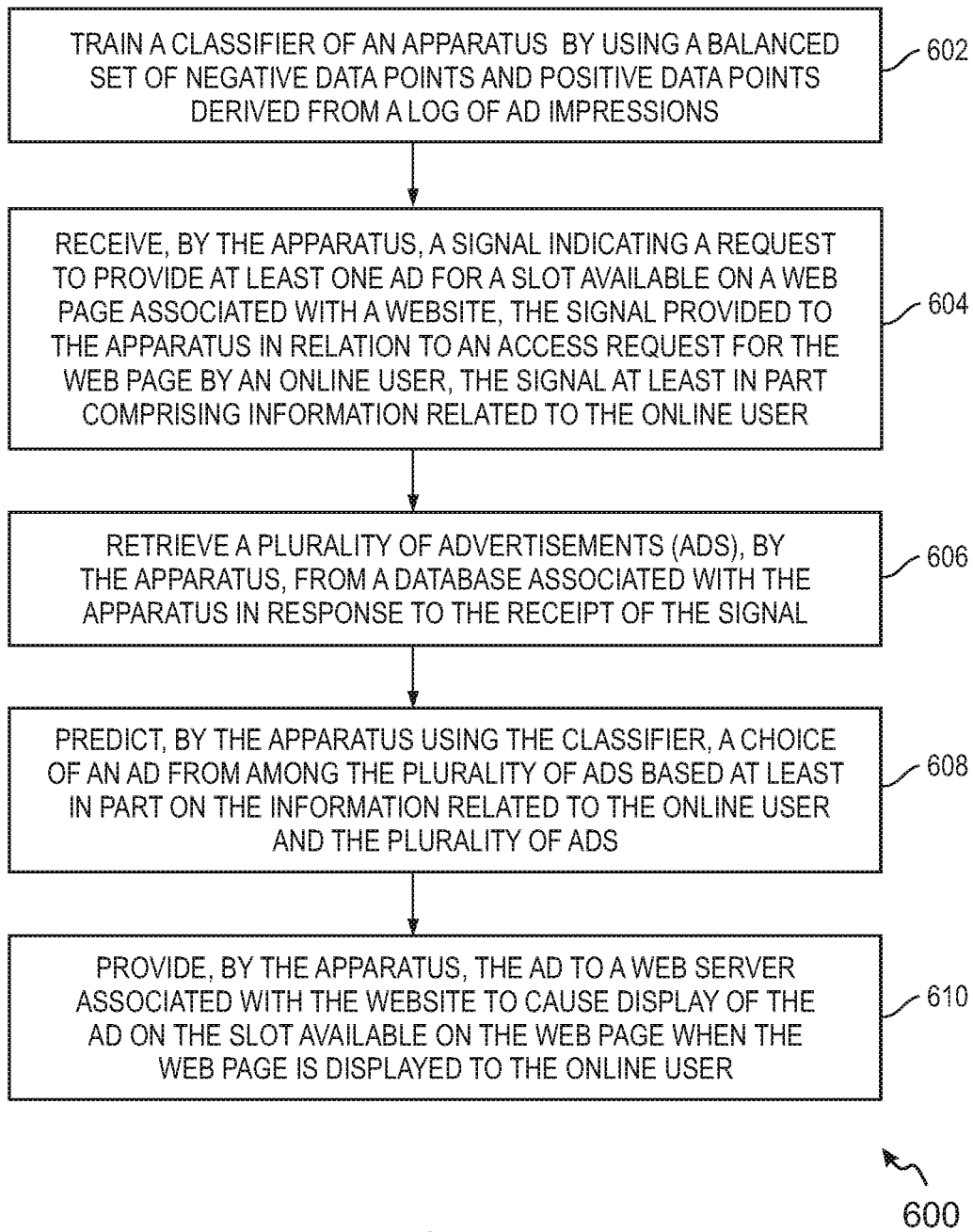
FIG. 6 shows a flow diagram of a method for providing Web advertisements to online users, in accordance with an embodiment of the invention.

FIG. 6 shows a flow diagram of a method 600 for providing Web advertisements to online users, in accordance with an embodiment of the invention. The various steps and/or operations of the flow diagram, and combinations of steps/operations in the flow diagram, may be implemented by, for example, hardware, firmware, a processor, circuitry and/or by an apparatus such as the apparatus 200 explained with reference to FIGS. 2 to 5 and/or by a different device associated with the execution of software that includes one or more computer program instructions. The method 600 starts at operation 602.

At operation 602 of the method 600, a classifier of an apparatus, such as the classifier 206 of the apparatus 200 is trained by using a balanced set of negative data points and positive data points derived from a log of Ad impressions. The balanced set is configured based at least in part on identifying a consensus among base cluster representations generated by clustering the negative data points using two or more clustering algorithms. The generation of the balanced set of data points and the training of the classifier may be performed as explained with reference to FIGS. 2 to 4 and is not explained again herein.

At operation 604 of the method 600, a signal indicating a request to provide at least one Ad for a slot available on a Web page associated with a website is received by the apparatus. The signal is provided to the apparatus in relation to an access request for the Web page by an online user as explained with reference to 508 in the sequence flow diagram 500 in FIG. 5. The signal at least in part comprising information related to the online user. For example, the information related to the online user may include information such as user identification information, user device information (for example, device type, device operating system, browser information etc.) IP address, user contact information (for example, email address, billing address, phone number etc.).

At operation 606 of the method 600, a plurality of advertisements (Ads) is retrieved by the apparatus from a database, such as the database 214 associated with the apparatus 200 shown in FIG. 2, in response to the receipt of the signal.

At operation 608 of the method 600, a choice of an Ad from among the plurality of Ads is predicted by the apparatus using a classifier based at least in part on the information related to the online user and the plurality of Ads. The term 'predicting a choice of an Ad' as used herein implies providing a selection of an Ad from among the plurality of Ads, which is most likely to meet the predefined objective of increasing a likelihood of the online user clicking on the Ad, of increasing a likelihood of the online user engaging in a purchase transaction in relation to the Ad, or of increasing an awareness of the online user.

At operation 610 of the method 600, the Ad is provided by the apparatus to a Web server associated with the website to cause display of the Ad on the slot available on the Web page when the Web page is displayed to the online user. The display of the Ad on the slot in the Web page UI may be performed as shown with reference to advertisement 112 in FIG. 1A.

Figure 7:
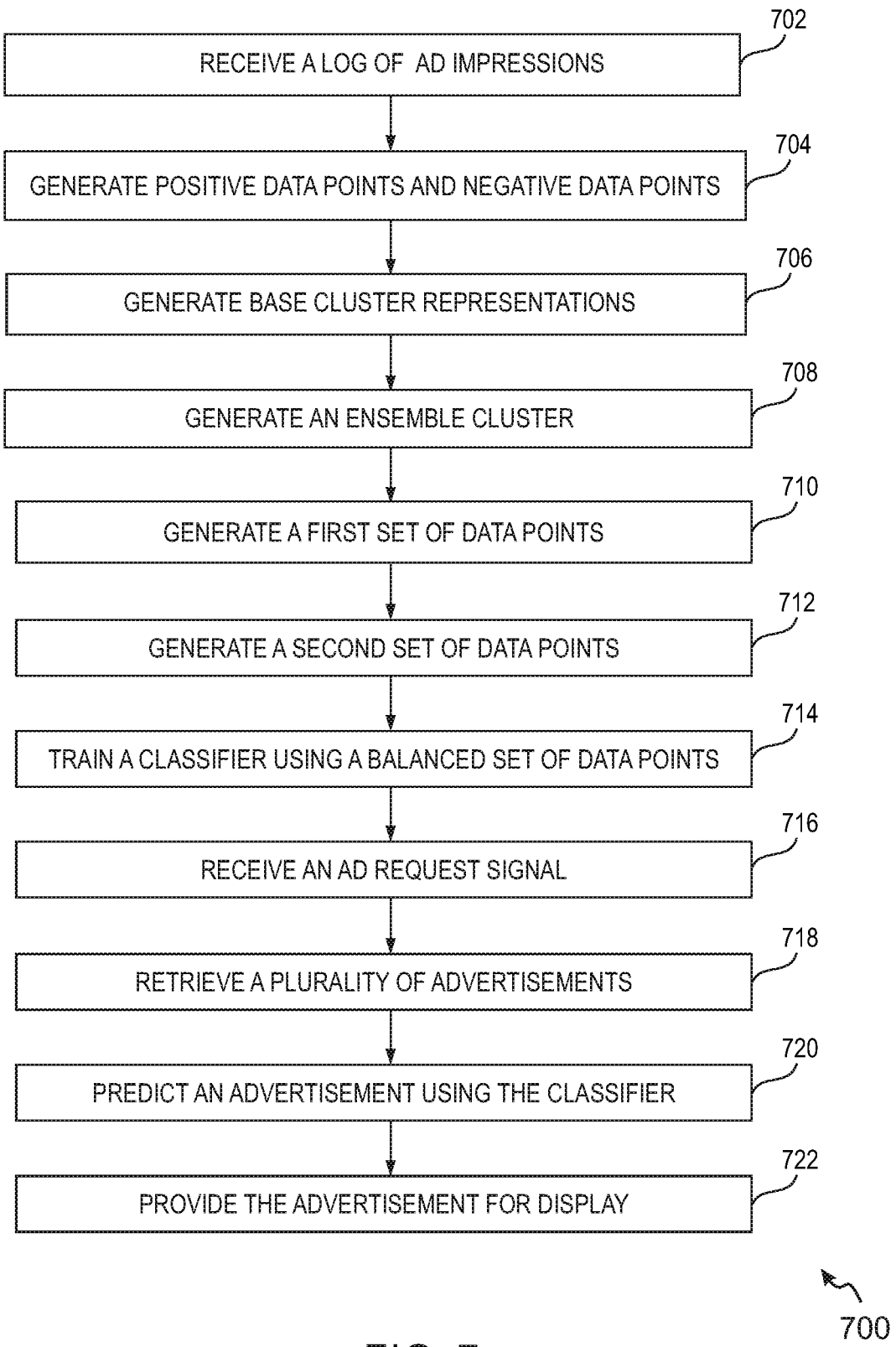
FIG. 7 shows a flow diagram of a method for providing a Web advertisements to online users, in accordance with another embodiment of the invention.

FIG. 7 shows a flow diagram of a method 700 for providing Web advertisements to online users, in accordance with another embodiment of the invention. The various steps and/or operations of the flow diagram, and combinations of steps/operations in the flow diagram, may be implemented by, for example, hardware, firmware, a processor, circuitry and/or by an apparatus such as the apparatus 200 explained with reference to FIGS. 2 to 4 and/or by a different device associated with the execution of software that includes one or more computer program instructions. The method 700 starts at operation 702.

At operation 702 of the method 700, a log of advertisement (Ad) impressions is received from at least one of one or more demand-side platforms (DSPs) and one or more Ad Exchanges.

At operation 704 of the method 700, negative data points and positive data points are generated based on the log of Ad impressions.

At operation 706 of the method 700, the negative data points are clustered using two or more clustering algorithms to generate corresponding base cluster representations.

At operation 708 of the method 700, consensus among the base cluster representations is identified to generate an ensemble cluster.

At operation 710 of the method 700, a plurality of data points within a predefined distance from a cluster center of the ensemble cluster is selected for generation of a first set of data points.

At operation 712 of the method 700, a second set of data points is generated by oversampling the positive data points.

At operation 714 of the method 700, a classifier is trained based on a balanced set of data points configured from the first set of data points and the second set of data points.

At operation 716 of the method 700, a signal indicating a request to provide at least one Ad for a slot available on a Web page associated with a website is received. The signal indicating the request to provide the at least one Ad is also referred to herein as 'Ad request signal'.

At operation 718 of the method 700 a plurality of advertisements (Ads) is retrieved from a database in response to the receipt of the Ad request signal.

At operation 720 of the method 700, a choice of an Ad is predicted from among the plurality of Ads using the classifier based at least in part on the information related to the online user and the plurality of Ads.

At operation 722 of the method 700, the Ad is provided to a Web server associated with the website to cause display of the Ad on the slot available on the Web page when the Web page is displayed to the online user.

Various embodiments disclosed herein provide numerous advantages. More specifically, the embodiments disclosed herein suggest techniques for providing Web advertisements to online users. Imbalanced data set (i.e. positive and negative data points) are balanced for identifying relevant creatives for configuring the Web advertisements. The Web advertisements provided to the online users in such a manner optimizes the click through rate and/or the conversion rate for the respective Ads. Moreover, such balancing of data sets overcomes drawbacks of conventional mechanisms, which were not able to deal with categorial features during data balancing or provide satisfactory results on unseen data.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200 and its various components such as the processor 250, the memory 208, the I/O module 210 and the communication module 212 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 7 and 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein with reference to FIGS. 6 and 7. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for providing Web advertisements to online users, the method comprising:

training a classifier of an apparatus associated with an advertisement (Ad) server by using a balanced set of negative data points and positive data points derived from a log of Ad impressions, the balanced set configured based at least in part on identifying a consensus among base cluster representations generated by clustering the negative data points using two or more clustering algorithms;

receiving, by the apparatus, a signal indicating a request to provide at least one Ad for a slot available on a Web page associated with a website, the signal provided to the apparatus in relation to an access request for the Web page by an online user, the signal at least in part comprising information related to the online user;

retrieving a plurality of advertisements (Ads), by the apparatus, from a database associated with the apparatus in response to the receipt of the signal;

predicting, by the apparatus using the classifier, a choice of an Ad from among the plurality of Ads based at least in part on the information related to the online user and the plurality of Ads; and providing, by the apparatus, the Ad to a Web server associated with the website to cause display of the Ad on the slot available on the Web page when the Web page is displayed to the online user.

2. The method of claim 1, wherein the log of Ad impressions comprises information related to at least one of:

Ads impressions associated with one or more Ad publishers, and online users of the one or more Ad publishers served with the Ad impressions.

3. The method of claim 2, further comprising:

extracting, by the apparatus, features from the information related to the Ad impressions and the online users, wherein extracting features from the information related to the Ad impressions at least comprises extracting information related to baseline content, theme, background, message and call-to-action button from a respective Ad; and tagging, by the apparatus, each feature with a label indicative of whether a click or a conversion is associated with the respective Ad, wherein the tagging of each feature is configured to generate the negative data points and the positive data points.

4. The method of claim 3, further comprising:

generating, by the apparatus, an ensemble cluster based on identifying the consensus among the base cluster representations of the negative data points generated using the two or more clustering algorithms.

5. The method of claim 4, further comprising:

selecting, by the apparatus, a plurality of data points within a predefined distance from a cluster center of the ensemble cluster, wherein the selected plurality of data points configure a first data of data points, the first set of data points representative of an undersampled form of the negative data points.

6. The method of claim 5, further comprising:

generating, by the apparatus, a second set of data points by oversampling the positive data points, wherein the first set of data points and the second set of data points configure the balanced set of the negative data points and the positive data points.

7. The method of claim 6, wherein the two or more clustering algorithms used to cluster the negative data points to generate the base cluster representations comprise at least one of Latent Dirichlet Allocation (LDA) clustering algorithm, Gaussian Mixture Models (GMM) clustering algorithm and K-Means clustering algorithm, and wherein Synthetic Minority Over-sampling Technique (SMOTE) algorithm is used for oversampling the positive data points.

8. The method of claim 1, further comprising:

receiving, by the apparatus, information related to Ad impressions from one or more demand-side platforms (DSPs) and one or more Ad Exchanges, wherein the log of Ad impressions is generated based on the information related to Ad impressions received from the one or more DSPs and the one or more Ad Exchanges; and assigning relevancy weights, by the apparatus, to the Ad impressions based on prior knowledge of quality of traffic associated with respective DSP from among the one or more DSPs and respective Ad Exchange from among the one or more Ad Exchanges.

9. The method of claim 1, wherein the classifier is trained to meet a predefined objective, the predefined objective corresponding to at least one objective from among an objective to increase a likelihood of the online user clicking on the Ad, an objective to increase a likelihood of the online user engaging in a purchase transaction in relation to the Ad, and an objective to increase an awareness of the online user.

10. An apparatus for providing Web advertisements to online users, the apparatus comprising:
a memory for storing instructions; and
a processor configured to execute the instructions and thereby cause the apparatus to at least:
train a classifier by using a balanced set of negative data points and positive data points derived from a log of Ad impressions, the balanced set configured based at least in part on identifying a consensus among base cluster representations generated by clustering the negative data points using two or more clustering algorithms;
receive a signal indicating a request to provide at least one Ad for a slot available on a Web page associated with a website, the signal provided to the apparatus in relation to an access request for the Web page by an online user, the signal at least in part comprising information related to the online user;
retrieve a plurality of advertisements (Ads), by the apparatus, from a database associated with the apparatus in response to the receipt of the signal;
predict using the classifier, a choice of an Ad from among the plurality of Ads based at least in part on the information related to the online user and the plurality of Ads; and
provide the Ad to a Web server associated with the website to cause display of the Ad on the slot available on the Web page when the Web page is displayed to the online user.

11. The apparatus of claim 10, wherein the log of Ad impressions comprises information related to at least one of:
Ads impressions associated with one or more Ad publishers, and
online users of the one or more Ad publishers served with the Ad impressions.

12. The apparatus of claim 11, wherein the apparatus is further caused to:
extract features from the information related to the Ad impressions and the online users, wherein extracting features from the information related to the Ad impressions at least comprises extracting information related to baseline content, theme, background, message and call-to-action button from a respective Ad; and
tag each feature with a label indicative of whether a click or a conversion is associated with the respective Ad, wherein the tagging of each feature is configured to generate the negative data points and the positive data points.

13. The apparatus of claim 12, wherein the apparatus is further caused to:
generate an ensemble cluster based on identifying the consensus among the base cluster representations of the negative data points generated using the two or more clustering algorithms.

14. The apparatus of claim 13, wherein the apparatus is further caused to:
select a plurality of data points within a predefined distance from a cluster center of the ensemble cluster, wherein the selected plurality of data points configure a first data of data points, the first set of data points representative of an undersampled form of the negative data points.

15. The apparatus of claim 14, wherein the apparatus is further caused to:
generate a second set of data points by oversampling the positive data points, wherein the first set of data points and the second set of data points configure the balanced set of the negative data points and the positive data points.

16. The apparatus of claim 15, wherein the two or more clustering algorithms used to cluster the negative data points to generate the base cluster representations comprise at least one of Latent Dirichlet Allocation (LDA) clustering algorithm, Gaussian Mixture Models (GMM) clustering algorithm and K-Means clustering algorithm, and wherein Synthetic Minority Over-sampling Technique (SMOTE) algorithm is used for oversampling the positive data points.

17. The apparatus of claim 10, wherein the classifier is trained to meet a predefined objective, the predefined objective corresponding to at least one objective from among an objective to increase a likelihood of the online user clicking on the Ad, an objective to increase a likelihood of the online user engaging in a purchase transaction in relation to the Ad, and an objective to increase an awareness of the online user.

18. A non-transitory computer-readable medium storing a set of instructions that when executed cause a computer to perform a method for providing Web advertisements to online users, the method comprising:
training a classifier by using a balanced set of negative data points and positive data points, the balanced set configured by:
receiving a log of advertisement (Ad) impressions from at least one of one or more demand-side platforms (DSPs) and one or more Ad Exchanges,
deriving the negative data points and the positive data points based at least in part on the log of Ad impressions,
clustering the negative data points using two or more clustering algorithms to generate corresponding base cluster representations,
identifying consensus among the base cluster representations to generate an ensemble cluster,
selecting a plurality of data points within a predefined distance from a cluster center of the ensemble cluster, wherein the selected plurality of data points configure a first data of data points, and
generating a second set of data points by oversampling the positive data points, wherein the first set of data points and the second set of data points configure the balanced set of data points;
receiving a signal indicating a request to provide at least one Ad for a slot available on a Web page associated with a website, the signal provided to the computer in relation to an access request for the Web page by an online user, the signal at least in part comprising information related to the online user;
retrieving a plurality of advertisements (Ads) from a database in response to the receipt of the signal;
predicting, using the classifier, a choice of an Ad from among the plurality of Ads based at least in part on the information related to the online user and the plurality of Ads; and providing the Ad to a Web server associated with the website to cause display of the Ad on the slot available on the Web page when the Web page is displayed to the online user.

19. The computer-readable medium of claim 18, wherein the log of Ad impressions comprises information related to at least one of:

Ads impressions associated with one or more Ad publishers, and online users of the one or more Ad publishers served with the Ad impressions.

20. The computer-readable medium of claim 19, wherein the method further comprises:

extracting features from the information related to the Ad impressions and the online users, wherein extracting features from the information related to the Ad impressions at least comprises extracting information related to baseline content, theme, background, message and call-to-action button from a respective Ad; and tagging each feature with a label indicative of whether a click or a conversion is associated with the respective Ad, wherein the tagging of each feature is configured to generate the negative data points and the positive data points.

\* \* \* \* \*